US008767578B2

(12) United States Patent
Shin et al.

(10) Patent No.: US 8,767,578 B2
(45) Date of Patent: Jul. 1, 2014

(54) METHOD AND APPARATUS FOR ACCESS CONTROL IN WIRELESS COMMUNICATION SYSTEM

(75) Inventors: Wooram Shin, Daejeon (KR); Hyun-jae Kim, Incheon (KR); Anseok Lee, Daejeon (KR); Keun Young Kim, Seongnam-si (KR); Kwang Jae Lim, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 294 days.

(21) Appl. No.: 13/326,822

(22) Filed: Dec. 15, 2011

(65) Prior Publication Data

US 2012/0155304 A1  Jun. 21, 2012

(30) Foreign Application Priority Data

Dec. 16, 2010 (KR) .................. 10-2010-0129408
Jun. 30, 2011 (KR) .................. 10-2011-0064855

(51) Int. Cl.
*H04L 12/52* (2006.01)

(52) U.S. Cl.
USPC ............ 370/252; 370/255; 370/338; 370/344

(58) Field of Classification Search
USPC ................. 370/236, 252–255, 312, 319, 321, 370/328–338, 344, 401, 447, 461
See application file for complete search history.

(56) References Cited

U.S. PATENT DOCUMENTS

| 8,130,654 | B2* | 3/2012 | Garcia-Luna-Aceves et al. ............... 370/236 |
| 8,248,994 | B2* | 8/2012 | Kim et al. ..................... 370/328 |
| 8,498,228 | B2* | 7/2013 | Lee et al. ...................... 370/310 |
| 2003/0067892 | A1* | 4/2003 | Beyer et al. .................... 370/328 |
| 2006/0126553 | A1* | 6/2006 | Lim et al. ...................... 370/321 |
| 2007/0070937 | A1* | 3/2007 | Demirhan et al. ............ 370/328 |
| 2007/0230405 | A1* | 10/2007 | Yin et al. ...................... 370/335 |
| 2008/0144643 | A1* | 6/2008 | Berg ............................. 370/401 |
| 2008/0151926 | A1* | 6/2008 | Mosko et al. ................. 370/447 |
| 2008/0151928 | A1* | 6/2008 | Mosko et al. ................. 370/461 |
| 2011/0116485 | A1* | 5/2011 | Olszewski et al. ............ 370/338 |
| 2012/0087327 | A1* | 4/2012 | Ratasuk et al. ............... 370/329 |
| 2012/0155365 | A1* | 6/2012 | Hollick et al. ................ 370/312 |
| 2013/0010623 | A1* | 1/2013 | Golitschek .................... 370/252 |

OTHER PUBLICATIONS

Bayer et al, Transmission timing of signaling messages in IEEE 802.16 based Mesh Networks, Apr. 2006.*
Shin et al, Efficient 2-D Mesh Election Algorithms for OFDMA-Based Wireless Mesh Networks, Dec. 2011.*

(Continued)

*Primary Examiner* — Michael Thier
*Assistant Examiner* — Vincelas Louis
(74) *Attorney, Agent, or Firm* — Staas & Halsey LLP (57) ABSTRACT

In an orthogonal frequency division multiple access (OFDMA)-based wireless mesh network, a communication node receives information regarding a next transmission time of a 1-hop node and a 2-hop node through the 1-hop node, calculates next transmission intervals of the 1-hop node and the 2-hop node, determines a next transmission time of the communication node by using the next transmission intervals of the 1-hop node and the 2-hop node, and then transmits, to an 1-hop node of the communication node, the information of the next transmission time together with the information of the transmission time of the 1-hop node, received from the 1-hop node.

20 Claims, 4 Drawing Sheets

(56) References Cited

OTHER PUBLICATIONS

Lee et al, An Enhanced Election-Based Transmission Timing Mechanism in IEEE 802.16 Mesh Networks, Oct. 2008.*

Vijayalayan et al, Fast Channel Establishment for IEEE 802.16 Wireless Mesh Networks, Dec. 2010.*

Mogre et al, The IEEE 802.16-2004 MeSH Mode Explained Technical Report KOM-TR-2006-08.*

Wang et al, Improving the Performances of Distributed Coordinated Scheduling in IEEE 802.16 Mesh Networks.*

"IEEE Standard for Local and Metropolitan Area Networks—Part 16: Air Interface for Broadband Wireless Access Systems" IEEE 802.16, IEEE Std 802.16-2004.

* cited by examiner

METHOD AND APPARATUS FOR ACCESS CONTROL IN WIRELESS COMMUNICATION SYSTEM

CROSS-REFERENCE TO RELATED APPLICATION

This application claims priority to and the benefit of Korean Patent Application Nos. 10-2010-0129408 and 10-2011-0064855 filed in the Korean Intellectual Property Office on Dec. 16, 2010 and Jun. 30, 2011, the entire contents of which are incorporated herein by reference.

BACKGROUND OF THE INVENTION (a) Field of the Invention

The present invention relates to a method and apparatus for access control in a wireless communication system. More particularly, the present invention relates to a method for access control in an orthogonal frequency division multiple access (OFDMA)-based wireless mesh network system.

(b) Description of the Related Art

The related art access control for a wireless mesh network has been proposed with respect to orthogonal frequency division multiplexing (OFDM)-based time division multiple access. However, in such access control, the longer the length of an OFDM fast Fourier transform (FFT) is, the greater the amount of transmission power required and the greater the degradation of the resource allocation efficiency for a small burst.

Particularly, since a guard symbol required for transmission/reception conversion is allocated for each transmission in a wireless mesh network, unlike a cellular network, resource transmission efficiency for a small burst may be severely deteriorated.

In order to increase efficiency in resource use, an OFDMA-based wireless mesh network needs to be introduced. Therefore, there is a need for a method of access control for an OFDMA-based wireless mesh network.

SUMMARY OF THE INVENTION

The present invention has been made in an effort to provide a method and apparatus for access control for an orthogonal frequency division multiple access (OFDMA)-based wireless mesh network.

An exemplary embodiment an exemplary embodiment of the present invention provides a method for access control in a communication node of an OFDMA-based wireless mesh network. An exemplary embodiment of the present invention provides a method for access control in a communication node of an orthogonal frequency division multiple access (OFDMA)-based wireless mesh network, including: receiving information regarding a next transmission time of a 1-hop node and a 2-hop node through the 1-hop node; calculating next transmission intervals of the 1-hop node and the 2-hop node by using the information regarding the next transmission time of the 1-hop node and the 2-hop node; determining a subframe and a subchannel corresponding to the next transmission time of the communication node by using the next transmission intervals of the 1-hop node and the 2-hop node; and transmitting the information regarding the next transmission time of the communication node to a 1-hop node of the communication node.

The receiving may include: receiving first and second parameters of the 1-hop node and first to third parameters of the 2-hop node, wherein the next transmission interval of the 1-hop node is calculated by an equation below:

$$\text{ReceiveTime} + 2^{Exp} * Mx \leq \text{Next transmission Interval} < \text{ReceiveTime} + 2^{Exp} * Mx + 1, \text{ and}$$

the next transmission interval of the 2-hop node is calculated by an equation below:

$$\text{ReceiveTime} + 2^{Exp} * Mx + RxFwd\text{TimeDiff} \leq \text{Next transmission interval} < \text{ReceiveTime} + 2^{Exp} * Mx + 1 + RxFwd\text{TimeDiff}.$$

Here, the first, second, and third parameters may correspond to Exp, Mx, and RxFwdTimeDiff, and the ReceiveTime may indicate the time when the first to third parameters are received.

The transmitting of the information regarding next transmission time of the communication node to the 1-hop node of the communication node may include: calculating the first parameter and the second parameter corresponding to the next transmission time of the communication node; and transmitting the first and second parameters to the 1-hop node of the communication node.

Furthermore, the calculating of the first parameter and the second parameter may include: determining the first parameter according to at least one of a predetermined system value, QoS, and priority; and calculating the second parameter by using the determined first parameter and the next transmission time of the communication node.

The transmitting of the information regarding the next transmission time to the 1-hop node of the communication node may include: obtaining the third parameter from a time difference between the time when the first and second parameters of the 1-hop node are received and the time when the first parameter and the second parameter of the communication node are to be transmitted; and transmitting the first to third parameters of the 1-hop node to the 1-hop node.

The transmitting of the information regarding the next transmission time of the communication node to the 1-hop node of the communication node may include setting information of the subchannel corresponding to the next transmission time in a bitmap and transmitting the same.

The determining may include: electing competing nodes to participate in competition for subframe resources with the communication node by using the next transmission intervals of the 1-hop node and the 2-hop node; determining the subframe corresponding to the next transmission by using the next transmission interval of a 1-hop node among the competing nodes; electing subchannel-level competing nodes in the subframe for corresponding to the next transmission to participate in competition for subchannel resources with the communication node; and determining the subchannel corresponding to the next transmission by using the next transmission interval of the subchannel level competing node with respect to each subchannel of the subframe corresponding to the next transmission.

The electing of the competing nodes may include: electing a node that satisfies at least one of first to third conditions as the competing node, wherein the first condition is that the next transmission intervals of the 1-hop node and the 2-hop node include a temporary transmission time of the communication node, the second condition is that the sum of minimum values in the next transmission intervals of the 1-hop node and the 2-hop node and a hold-off time for which the 1-hop node and the 2-hop node cannot transmit is smaller than the temporary transmission time of the communication node, and the third condition is that information of the next transmission time is unavailable.

The electing of the subframe-level competing nodes may further include varying the hold-off time according to a density of communication nodes in the wireless mesh network, delay conditions, a period of resources, and the amount of resources.

The determining of the subframe corresponding to the next transmission may include executing a mesh election algorithm by using a 1-hop node of the competing nodes and a target subframe.

The electing of the subchannel-level competing nodes may include: executing a self mesh election algorithm with a 1-hop node of each 2-hop node among the competing nodes; and electing a 2-hop node elected by the mesh election algorithm as the subchannel level competing node.

The determining of the subchannel corresponding to the next transmission may include: executing a mesh election algorithm by using the subchannel-level competing node, a target subframe, and a subchannel with respect to each subchannel of the subframe corresponding to the next transmission.

Another embodiment of the present invention provides an apparatus for access control of a communication node in an orthogonal frequency division multiple access (OFDMA)-based wireless mesh network. The apparatus for access control includes a transmission-time determining unit and an information transmitting unit. The transmission-time determining unit calculates next transmission intervals of a 1-hop node and a 2-hop node, and determines a subframe and a subchannel corresponding to the next transmission time of the communication node by using next transmission intervals of the 1-hop node and the 2-hop node. The information transmitting unit obtains at least one parameter used in expressing the next transmission interval of the communication node from the next transmission time of the communication node, and transmits the at least one parameter to a 1-hop node of the communication node.

The information transmitting unit may determine a first parameter according to a predetermined system value or QoS, and calculate a second parameter by using a time when the first parameter and the at least one parameter are to be transmitted and the next transmission time of the communication node.

The apparatus for access control may further include an information receiving unit receiving the first and second parameters indicating the next transmission time of the 1-hop node from the 1-hop node. Here, the information transmitting unit may acquire a third parameter from a time difference between a time when the first and second parameters of the 1-hop node are received and a time when the at least one parameter of the communication node is to be transmitted, and transmitting the first to third parameters of the 1-hop node together with the at least one parameter.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and the claims, unless explicitly described to the contrary, the word "comprise" and variations such as "comprises" or "comprising" will be understood to imply the inclusion of stated elements but not the exclusion of any other elements.

Hereinafter, a method and apparatus for access control in a wireless communication system according to an exemplary embodiment of the present invention will be described in detail.

Figure 1:
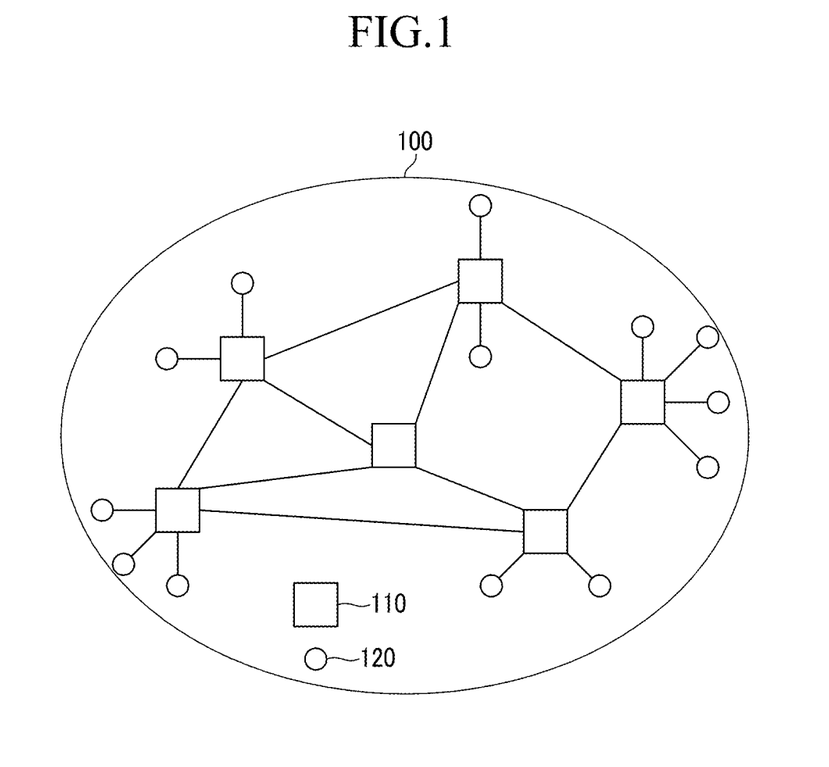
FIG. 1 is a view illustrating a wireless communication system according to an exemplary embodiment of the present invention.

FIG. 1 is a view illustrating a wireless communication system according to an exemplary embodiment of the present invention.

The wireless network system according to an exemplary embodiment of the present invention refers to a network system in which communication takes place between communication nodes constituting a network such as a wireless mesh network or a mobile ad hoc network.

FIG. 1 illustrates a wireless mesh network system in which a plurality of nodes communicate in a multi-hop fashion, as a wireless network system to which the exemplary embodiment of the present invention is applied.

Referring to FIG. 1, a wireless mesh network system 100 includes a plurality of communication nodes 110 and 120.

Each communication node 110 may be an access point serving as a base station, and each communication node 120 may be a terminal communicating with the communication node 110.

These communication nodes 110 and 120 perform wireless communication by using an orthogonal frequency division multiple access (OFDMA) scheme.

Furthermore, the communication nodes 110 and 120 select neighboring nodes according to transmission power coverage (or other conditions), and exchange information regarding reserved resources for use in the next transmission with the neighboring communication nodes, thus controlling channel (or resource) access such that collision with the neighboring communication nodes does not occur by avoiding using resources reserved by the neighboring communication nodes.

Typically, the neighboring communication nodes, which can receive transmission power from any communication node 110, are defined as 1-hop nodes of the communication node 110. Among 1-hop nodes of the communication node 110, nodes that do not overlap the 1-hop nodes of the communication node 110 are defined as 2-hop nodes of the communication node 110.

Figure 2:
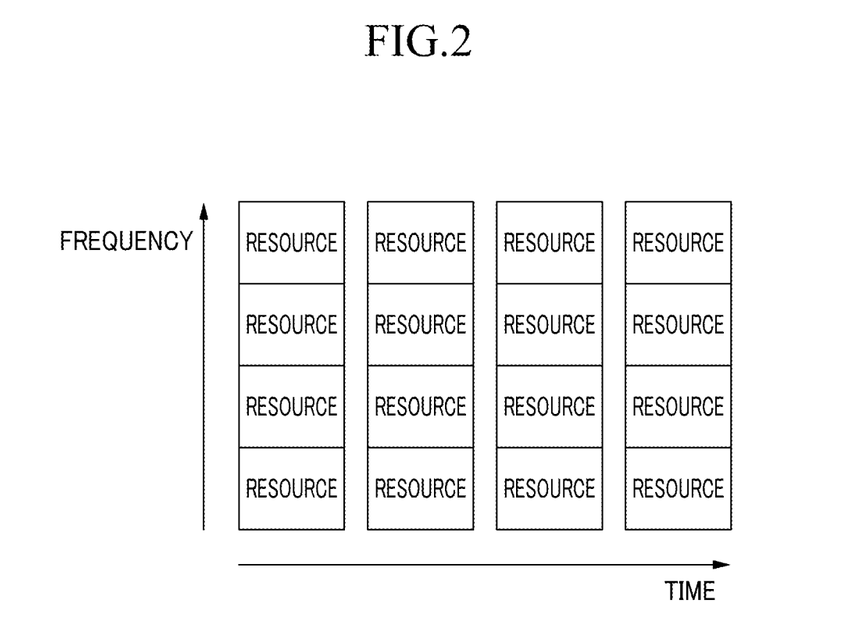
FIG. 2 is a view illustrating resources in an OFDMA-based wireless mesh network system according to an exemplary embodiment of the present invention.

FIG. 2 illustrates resources in an OFDMA-based wireless mesh network system according to an exemplary embodiment of the present invention.

Referring to FIG. 2, the resources in the OFDMA-based wireless mesh network system may be classified by the time axis and the frequency axis. Hereinafter, the resources by the time axis are referred to subframes, and the resources by the frequency axis are referred to as subchannels.

That is, the communication nodes 110 and 120 of the OFDMA-based wireless mesh network system control to which subchannel and subframe the resources are to be sent. In this case, the communication nodes 110 and 120 can perform only transmission or reception within a single subframe.

In the OFDMA-based wireless mesh network system, access conditions for preventing collision in reception from a 1-hop node and for preventing the simultaneous occurrence of transmission/reception are as follows:

As for the first condition, when any one node among 1-hop nodes of any communication node performs transmission, transmission cannot be carried out in a subframe in transmission. This is to prevent the simultaneous occurrence of transmission/reception, such as when one of 1-hop nodes of any communication node transmits to the communication node while the communication node is in transmission. Particularly, the first condition has to be satisfied if each communication node needs to broadcast. As for the second condition, any communication node can receive from a plurality of 1-hop nodes through different subchannels within a single subframe. The second condition is not valid in an orthogonal frequency division multiplexing (OFDM)-based time division multiple access (TDMA) wireless mesh network system because multiple access in the frequency axis is impossible.

Since the communication nodes 110 and 120 perform access control satisfying the above two access conditions, simultaneous transmission/reception and collision occurring at the time of reception from their 1-hop node is prevented.

Hereinafter, a method for access control, which meets the access conditions of a communication node in the above OFDMA-based wireless mesh network system, will be described.

Figure 3:
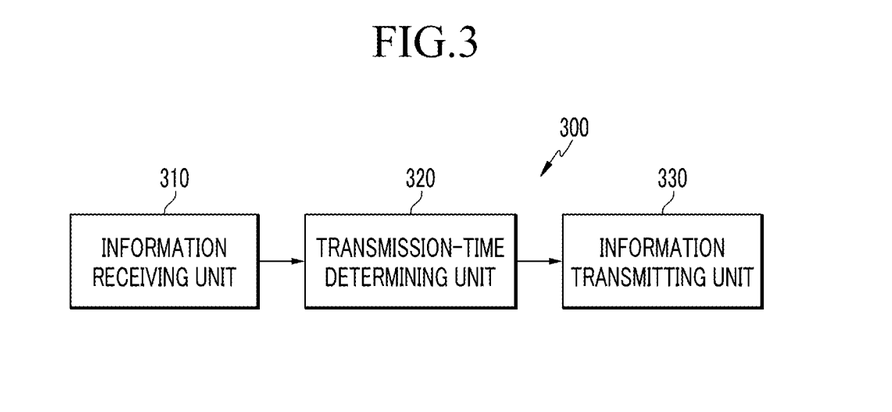
FIG. 3 is a schematic view illustrating a communication node according to an exemplary embodiment of the present invention.
Figure 4:
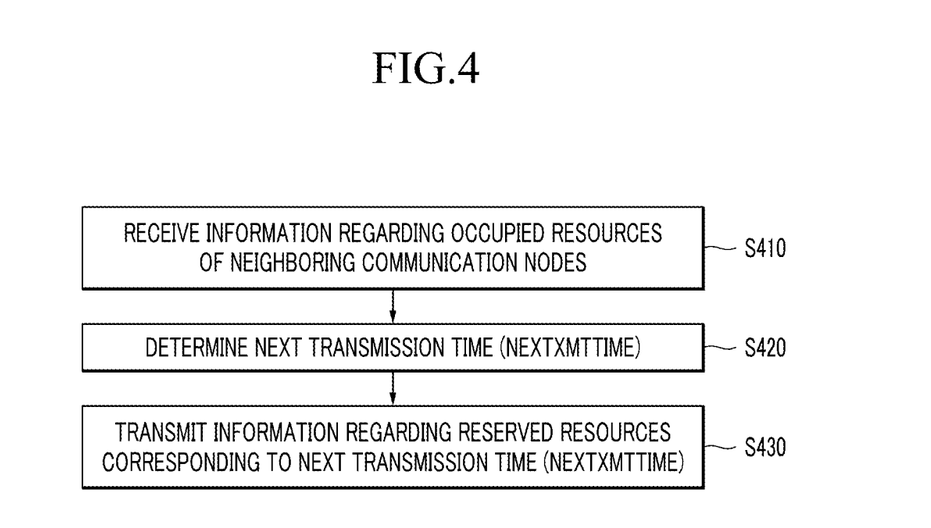
FIG. 4 is a flowchart illustrating a method for access control carried out in the communication node of FIG. 3.

FIG. 3 is a schematic view illustrating communication nodes according to an exemplary embodiment of the present invention, and FIG. 4 is a flowchart illustrating a method for access control performed in the communication node depicted in FIG. 3.

In FIG. 3 and FIG. 4, a communication node 300 may be an access control device that performs access control with respect to a channel (or resources), and may be an access control device of each of the communication nodes 110 and 120 depicted in FIG. 1.

Referring to FIG. 3, the communication node 300 includes an information receiving unit 310, a transmission-time determining unit 320, and an information transmitting unit 330.

As shown in FIG. 4, the information receiving unit 310 receives, from its 1-hop node, information regarding reserved resources of neighboring communication nodes and identifiers of the neighboring communication nodes, for example, node identifiers (ID) in operation S410. In this case, the neighboring communication nodes may include 1-hop nodes of the communication node 300 and 2-hop nodes of the communication node 300.

Also, the information regarding reserved resources may include reservation information of a subchannel and reservation information of a subframe indicating the next transmission time.

The reservation information of the subframe may include parameters (Exp, Mx, RxFwdTimeDiff) that can indicate the next transmission time. Parameter Exp is used to define the idle duration after transmission and to indicate the next transmission interval, and parameter Mx is also used to indicate the next transmission interval. Parameter RxFwdTimeDiff is a value for compensating for a time difference between the time when information regarding the next transmission interval of a 1-hop node was received and the time when the information is to be transmitted to 1-hop nodes.

The reservation information of a subchannel indicates in which subchannel of a corresponding subframe transmission occurs, and may be set by using a bitmap configured according to the number of subchannels within a single subframe. For example, in the case where a single subframe consists of four subchannels, the reservation information of the subchannel may be set in 4 bits. In this case, each bit may be set to 1 if the corresponding subchannel has been reserved, and if not, may be set to 0.

The transmission-time determining unit 320 determines the next transmission time (NextXmtTime) by using the information regarding reserved resources of the neighboring communication nodes, received from its 1-hop node, so as to meet the aforementioned access conditions in operation S420. The transmission-time determining unit 320 determines the next transmission time (NextXmtTime) and a subchannel for use in the next transmission time (NextXmtTime), prior to the already reserved transmission time (ReservedXmtTime).

When the next transmission time (NextXmtTime) and a subchannel for use in the next transmission time (NextXmtTime) are determined in the transmission-time determining unit 320, the information transmitting unit 330 transmits its identifier to its 1-hop node, and information regarding reserved resources corresponding to information regarding the determined next transmission time (NextXmtTime) and the subchannel for use in the next transmission time (NextXmtTime) in operation S430. In this case, the information transmitting unit 330 also transmits information regarding reserved resources of its 1-hop node, received from the 1-hop node.

In more detail, the information transmitting unit 330 converts the next transmission time (NextXmtTime) into parameters of Exp and Mx, and transmits the parameters Exp and Mx to its 1-hop node. Here, the parameters Exp and Mx indicate a time interval including a relative difference between the already reserved transmission time (ReservedXmtTime) at which the parameters Exp and Mx are to be transmitted, and the next transmission time. Furthermore, the information transmitting unit 300 transmits reservation information of a corresponding subchannel at the next transmission time, as well as the parameters Exp and Mx.

Hereinafter, a method of calculating parameters Exp and Mx in the information transmitting unit 300 will be described in detail.

When the next transmission time is determined by the transmission-time determining unit 320, the information transmitting unit 330 expresses a subframe for the next transmission as parameters Exp and Mx, and transmits these parameters Exp and Mx to its 1-hop node. In this case, the information transmitting unit 330 calculates the parameters Exp and Mx received from its 1-hop node, and parameter RxFwdTimeDiff denoting a time difference between the time when the parameters Exp and Mx were received from its 1-hop node and the time when the parameters are transmitted, and transmits the result of the calculation to a 1-hop node.

The parameters Exp, Mx, and RxFwdTimeDiff indicate that a corresponding 1-hop or 2-hop communication node is to transmit within the next transmission interval (NextXmtTimeInterval). First, the next transmission interval (NextXmtTimeInterval) of a 1-hop node induced from Exp and Mx may be calculated as expressed in Equation 1 below.

$$\text{Receive Time} + 2^{Exp} * Mx \leq \text{NextXmtTimeInterval} < \text{ReceiveTime} + 2^{Exp} * Mx + 1 \quad [\text{Equation 1}]$$

In Equation 1, the next transmission time interval (NextXmtTimeInterval) is expressed in a subframe number. ReceiveTime means a subframe number at the time of reception of parameters Exp and Mx. Since the parameters Exp and Mx are received at the already reserved transmission time (ReservedXmtTime) in a Tx node, ReceiveTime of an Rx node equals the already reserved transmission time (ReservedXmtTime) of the Tx node. The subframe number is a reference time that is synchronized over the entire network. The subframe number is circulated within a range of from 0 t (MaxSubframeNumber-1. Herein, MaxSubframeNumber denotes the maximum number of subframes limited by a bit size used when a communication node broadcasts a message associated with subframe synchronization. In the following description, the unit of ReceiveTime and Hold-offTime means a subframe number of a subframe number difference.

Exp and Mx are relative expressions of the next transmission intervals from the reserved transmission times (ReservedXmtTime) of a 1-hop node and a 2-hop node. Thus, by adding ReceiveTime to it as shown in Equation 1, the next transmission interval (NextXmtTimeInterval) of the corresponding node can be expressed in absolute time.

Meanwhile, the next transmission interval of a 2-hop node may be calculated as shown in Equation 2, by using the parameters Exp and Mx of the 2-hop node and parameter (RxFwdTimeDiff) indicating a time difference between the time when a 1-hop node transmitting parameters Exp and Mx of the 2-hop node received the parameters Exp and Mx and the time when it transmits those parameters.

$$\text{ReceiveTime} + 2^{Exp} * Mx + RxFwdTimeDiff \leq \text{NextXmtTimeInterval} < \text{ReceiveTime} + 2^{Exp} * Mx + 1 + RxFwdTimeDiff \quad \text{[Equation 2]}$$

The communication node 300 may use Exp as a fixed system parameter such that every communication node has an identical Exp, or use it variably according to priority so as to be a different value from another communication node. When high priority or high QoS such as short delay or a high data rate is required, the communication node 300 lowers the parameter Exp. In contrast, if low priority or low QoS such as long delay is sufficient, the communication node 300 may increase the parameter Exp in order to enhance the transmission chance of a neighboring communication node.

The information transmitting unit 330 may obtain Mx from the determined Exp with respect to the communication node 300 as expressed in Equation 3 below.

$$Mx = \text{floor}((\text{NextXmtTime} - \text{ReservedXmtTime})/2^{Exp}) \quad \text{[Equation 3]}$$

In Equation 3, floor( ) denotes truncation, and ReservedXmtTime denotes the absolute time of the time when the parameters Exp and Mx are transmitted. NextXmtTime denotes an absolute time, which indicates the next transmission time reserved by the transmission-time determining unit 320.

In Equation 3, the information transmitting unit 330 expresses the parameter Mx as a relative time by subtracting the time (ReservedXmtTime) when the parameters Exp and Mx are transmitted from the next transmission time (NextXmtTime).

The information transmitting unit 330 transmits, to its 1-hop nodes, parameters Exp and Mx indicating the next transmission interval, received from 1-hop nodes of the communication node 300, and reservation information of a subchannel to which these parameters Exp and Mx are to be transmitted. Furthermore, the information transmitting unit 330 calculates parameter RxFwdTimeDiff representing a time difference between the time (ReceiveTime) when the parameters Exp and Mx indicating the next transmission interval of 1-hop nodes are received and the time when these received parameters Exp and Mx are to be transmitted, and transmits the result of the calculation to its 1-hop nodes, together with the parameters Exp and Mx of 1-hop nodes and reservation information of a subchannel. That is, the parameter RxFwdTimeDiff may be calculated as expressed in Equation 4 below.

$$RxFwdTimeDiff = \text{ReservedXmtTime} - \text{ReceiveTime} \quad \text{[Equation 4]}$$

By doing so, all the communication nodes can learn the next transmission interval of 2-hop nodes and a subchannel reserved in the next transmission interval, as well as their 1-hop nodes.

Furthermore, the information transmitting unit 330 determines whether or not the minimum value in the next transmission interval of its 1-hop nodes is prior to the current transmission time (ReservedXmtTime). If the next transmission time of its 1-hop nodes is prior to the current transmission time (ReservedXmtTime), the information is considered insignificant and thus the information transmitting unit 330 does not deliver parameters Exp, Mx, and RxFwdTimeDiff of the corresponding 1-hop node, and reservation information of a subchannel. Accordingly, overhead can be reduced.

Figure 5:
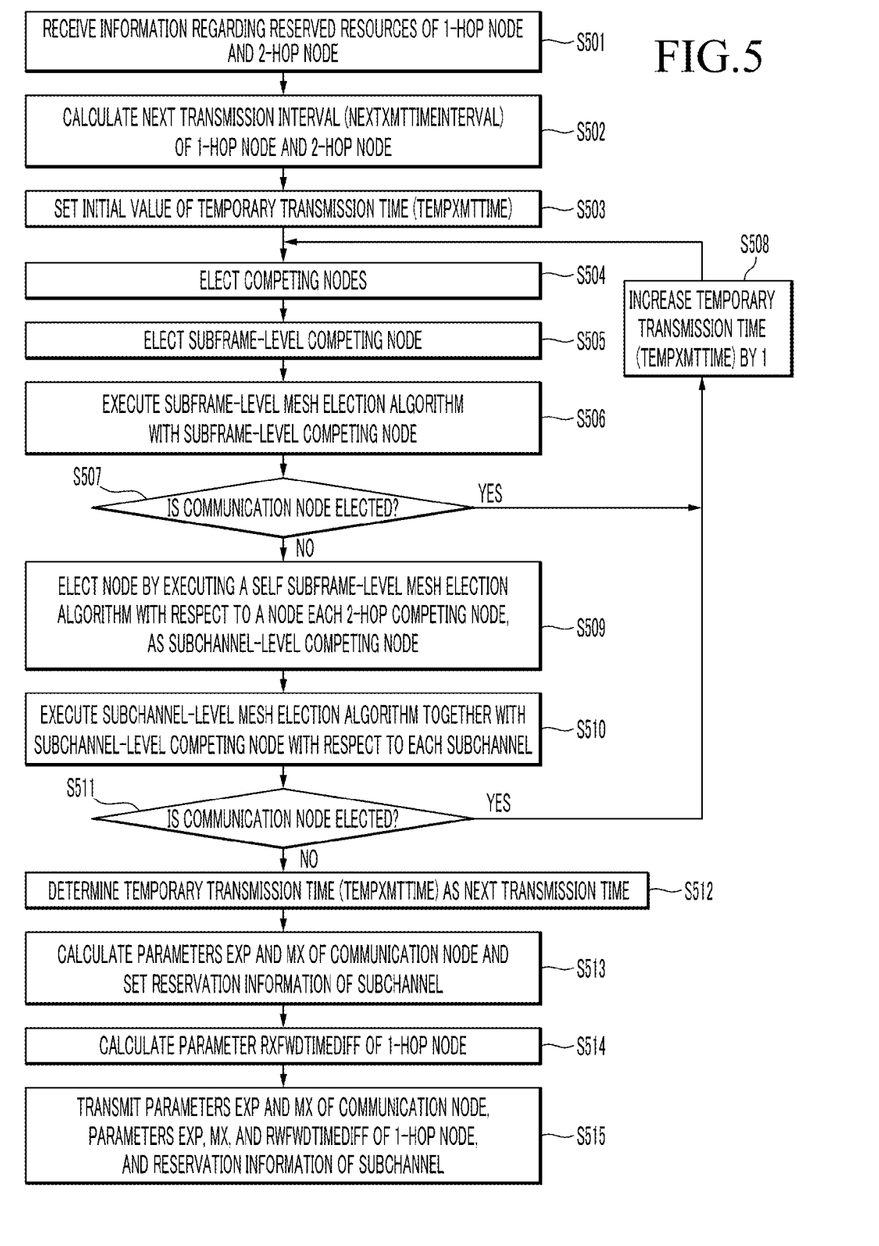
FIG. 5 is a flowchart illustrating a method of determining the next transmission time in a communication node according to an exemplary embodiment of the present invention.

FIG. 5 is a flowchart illustrating a method of determining the next transmission time in a communication node according to an exemplary embodiment of the present invention.

Referring to FIG. 5, when receiving, from its 1-hop node, identifiers of its 1-hop node and 2-hop node, and information regarding reserved resources, namely, parameters Exp, Mx, and RxFwdTimeDiff and reservation information of a subchannel, the information receiving unit 310 of the communication node 300 delivers the received information regarding reserved resources to the transmission-time determining unit 320.

When receiving information regarding reserved resources and identifiers of 1-hop and 2-hop nodes of the communication node 300 in operation S501, the transmission-time determining unit 320 of the communication node 300 calculates the next transmission intervals (NextXmtTimeInterval) of the 1-hop and 2-hop nodes by using the parameters Exp and Mx of the 1-hop node of the communication node 300 and the parameters Exp, Mx, and RxFwdTimeDiff of the 2-hop node thereof in operation S502. The next transmission intervals (NextXmtTimeInterval) of the 1-hop and 2-hop nodes may be calculated from Equations 1 and 2, respectively.

For a hold-off time (HoldoffTime) after transmission, the communication node 300 is disabled in terms of every transmission operation. This is to ensure delay within a predetermined range statistically for the transmission of 1-hop or 2-hop nodes. The hold-off time is set as expressed in Equation 5 below.

$$\text{HoldoffTime} = c * 2^{Exp} \quad \text{[Equation 5]}$$

In Equation 5, c denotes a system parameter, and may be varied according to a density of a communication node, delay conditions, a period of given resources, and the amount of resources in a wireless mesh network system.

Meanwhile, the existing OFDM-based TDMA wireless mesh network uses the hold-off time as $2^{(Exp+4)}$. That is, the existing OFDM-based TDMA wireless mesh network uses c fixed to $2^4$, and this may result in a reduction in resource utilization and an increase in delay.

In contrast, according to an exemplary embodiment of the present invention, the hold-off time may be appropriately varied depending on the density of a communication node, delay conditions, the period of given resources, and the amount of resources as expressed in Equation 5.

The communication node 300 calculates an initial value of a temporary transmission time (TempXmtTime), which may be the next transmission time of the already reserved transmission time (ReservedXmtTime), in due consideration of the hold-off time in operation S503. The initial value of the temporary transmission time (TempXmtTime) may be defined as expressed in Equation 6.

$$TempXmtTime = ReservedXmtTime + HoldoffTime \quad \text{[Equation 6]}$$

As described above, during at least the hold off time after the reserved transmission time (ReservedXmtTime), the communication node 300 has an idle time and is then enabled for transmission. Thus, the earliest possible transmission time as the next transmission time is calculated as expressed in Equation 6.

The temporary transmission time (TempXmtTime) is a subframe number that may be the next transmission time of the already reserved transmission time (ReservedXmtTime). When the communication node 300 wins a competition (or is elected in a mesh election algorithm) at the temporary transmission time (TempXmtTime), the temporary transmission time (TempXmtTime) becomes the next transmission time of the communication node 300. If the communication node 300 loses the competition (or is not elected in the mesh election algorithm), the communication node 300 increases the temporary transmission time (TempXmtTime) by 1 in operation S506 and then again enters into competition for the next temporary transmission time. In operation S504, the communication node 300 elects competing nodes in due consideration of the previously calculated next transmission intervals (NextXmtTimeInterval) of its 1-hop and 2-hop nodes, and the temporary transmission time (TempXmtTime).

Election criteria for selecting a competing node need to meet one of the following three conditions.

Firstly, the next transmission interval (NextXmtTimeInterval) includes the temporary transmission time (TempXmtTime) of the communication node 300.

Secondly, the sum of the minimum value of the next transmission interval (NextXmtTimeInterval) and the hold-off time of the communication node is smaller than the temporary transmission time (TempXmtTime).

Lastly, nodes are unaware of information regarding reserved resources.

Herein, since 1-hop nodes among competing nodes elected by these three conditions are nodes that are elected for time-axis competition, the 1-hop nodes are selected as subframe-level competition nodes from among the competing nodes selected by the three conditions in operation S505.

In operation S506, the communication node 300 executes a mesh election algorithm for the time-axis competition considering only the subframe-level competition nodes first.

The mesh election algorithm is an algorithm used in determining the next transmission time in the OFDM-based TDMA wireless mesh network. The mesh election algorithm can be expressed in terms of pseudocodes as follows, which is explicitly specified in IEEE 802.16-2004 Std. The mesh election algorithm for time-axis competition is defined as a subframe-level mesh election algorithm.

```
==========================================================
boolean MeshElection (uint32 TempXmtTime,uint16 MyNodeID,uint16
CompetingNodeIDList [ ] ))
{
  uint32 nbr smear val,
   smear_val1,smear_val2;
   smear_val1 =inline_smear(MyNodeID ^ TempXmtTime));
```
-continued
```
   smear val2 =inline smear(MyNodeID + TempXmtTime);
   For each Node ID nbrsNodeID in CompetingNodeIDList Do {
        nbr_smear_val =inline_smear(nbrsNodeID ^ TempXmtTime));
        if(nbr_smear_val >smear_val1) {
          return FALSE;//This node loses.
        }
        else if(nbr smear val ==smear val1 ) {
          // 1st tie-breaker.
          nbr_smear_val =inline_smear(nbrsNodeID +
          TempXmtTime);
          if(nbr_smear_val >smear_val2 ) {
            return FALSE;//This node loses.
          }
          else if(nbr_smear_val ==smear_val2 ) {
            //If we still collide at this point Break the tie based
            on MacAdr
            if ((TempXmtTime is even
            &&(nbrsNodeID >MyNodeID))||
            (TempXmtTime is odd &&(nbrsNodeID
            <MyNodeID ))) {
                return FALSE;//This node looses.
            }
          }
        }
     }//This node won over this competing node
   }//End for all competing nodes
   //This node is winner, it won over all competing nodes.
   return TRUE;
}
// Convert a uniform 16-bit value to an uncorrelated uniform 16-bit
hash value, uses mixing.
uint32 inline_smear(uint16 val) {
     val +=(val <<12);
     val ^=(val >>22);
     val +=(val <<4);
     val ^=(val >>9);
     val +=(val <<10);
     val ^=(val >>2);
     val +=(val <<7);
     val ^=(val >>12);
     return(val);
}
==========================================================
```

The above subframe-level mesh election algorithm may receive, as its input values, an identifier (MyNodeID) of the communication node 300, an identifier list (CompetingNodeIDList) of competing nodes, and the temporary transmission time (TempXmtTime) of the communication node 300. The subframe level mesh election algorithm operates by the principles of obtaining a hash value for each node and electing the communication node 300 only when the hash value of the communication node 300 is greater than the hash value of every competing node (CompetingNodeIDList). Otherwise the communication node 300 is not elected. In the case where the hash value of the communication node 300 is identical to hash values of any competing node, the communication node 300 is not elected if the temporary transmission time (TempXmtTime) is an odd number and the identifier (MyNodeID) of the communication node 300 is greater than that of the competing node or if the temporary transmission time (TempXmtTime) is an even number and the identifier (MyNodeID) of the communication node 300 is smaller than that of the competing node. When the communication node 300 is not elected with respect to the temporary transmission time (TempXmtTime) in operation S507, the temporary transmission time (TempXmtTime) of the communication node 300 is increased by 1, competing nodes are elected again in operations S504 and S505, and the subframe-level mesh election algorithm is executed in operation S506. In this way, the election of competing nodes and the execution of the subframe mesh election algorithm are repeated until the communication node 300 is elected.

When the communication node 300 is elected in the subframe level mesh election algorithm S507, each of nodes corresponding to 2-hop nodes among the competing nodes of the communication node 300 executes the aforementioned subframe-level mesh election algorithm together with nodes corresponding to its 1-hop nodes, thus electing a subchannel-level competing node in operation S509. That is, in this operation, each of nodes corresponding to 2-hop nodes among the competing nodes executes the subframe-level mesh election algorithm, and the 2-hop competing nodes elected herein are elected as subchannel-level competing nodes for frequency-axis completion, which is the next operation.

As the self subframe-level mesh election algorithm is executed with respect to each of the 2-hop competing nodes, uncertainty as to the transmission of the 2-hop competing nodes at the temporary transmission time is lowered by determining which of the 2-hop competing nodes participate in the frequency-axis completion, thereby increasing the election probability in the frequency-axis competition of the communication node. However, this may create a very low collision probability. In the case where there is a requirement that does not permit even a very small collision, the self subframe mesh election algorithm is omitted, and all the 2-hop competing nodes may be defined as subchannel-level competing nodes.

The communication node 30 executes the mesh election algorithm for the frequency-axis competition with subchannel-level competing nodes with respect to each subchannel in operation S510. The mesh election algorithm for the frequency-axis competition is defined as a subchannel-level mesh election algorithm. In this case, the communication node 300 executes the subchannel-level mesh election algorithm with itself and subchannel-level competing nodes other than nodes, which satisfy the first condition for electing competing nodes while a bitmap of a corresponding subchannel is 0. That is, the case where a bitmap of a corresponding subchannel is 0 while the first condition for electing competing nodes is satisfied means that the corresponding subchannel is not reserved at the temporary transmission time (TempXmtTime), and such nodes are thus excluded from competing nodes of the subchannel-level mesh election algorithm. The mesh election algorithm of this stage is identical to the previously described mesh election algorithm, except that a frequency (TempXmtTimeFreq) and the temporary transmission time considering both a target subchannel and the temporary transmission time (TempXmtTime), which is an input value, are used instead. Here, the frequency TempXmtTimeFreq may be expressed as in Equation 7.

$$TempXmtTimeFreq = NoSubchannel * TmepXmtTime + Subchannel\ number \quad [\text{Equation 7}]$$

In Equation 7, NoSubchannel denotes the number of subchannels of a single subframe, and the Subchannel number represents the number of times that the subchannel-level mesh election algorithm is executed for subchannels including the corresponding subchannel in the case where the subchannel-level mesh election algorithm is executed with respect to each subchannel. That is, the temporary transmission time and the frequency (TempXmtTimeFreq) become values considering both the time axis and the frequency axis.

When the communication node 300 is elected in the subchannel-level mesh election algorithm in operation S511, the communication node 300 determines the temporary transmission time (TempXmtTime) of that time as the next transmission time (NextXmtTime) in operation S512. In some cases, the communication node 300 may be elected for several subchannels. In the case where the communication node 300 is elected for several subchannels, subchannels among the subchannels for which the communication node 300 has been elected may be elected, wherein the number of subchannels being elected corresponds to the number of subchannels that can be simultaneously reserved by system requirements.

When the next transmission time (NextXmtTime) is determined in operation S512, the communication node 300 calculates parameters Exp and Mx from the next transmission time (NextXmtTime), and reservation information regarding the selected subchannel is set in a bitmap in operation S513.

Furthermore, in order to send 1-hop nodes reservation information of the 1-hop nodes as well as information regarding reserved resources of the communication node 300, the time difference (RxFwdTimeDiff) between the time when information regarding reserved sources of the 1-hop nodes was received and the time when the information is to be transmitted is calculated in operation S514.

The communication node 300 transmits, to the 1-hop nodes, the calculated parameters Exp and Mx of the communication node 300, the reservation information of the subchannel expressed in a bitmap, the parameters Exp, Mx, and RxFwdTimeDiff of the 1-hop nodes of the communication node 300, and the reservation information of the subchannel of the 1-hop nodes in operation S515. Herein, values received from the 1-hop nodes are transmitted as they are as the parameters Exp and Mx of the 1-hop nodes.

Meanwhile, when the result of executing the subchannel-level mesh election algorithm with subchannel-level competing nodes for each channel reveals that there is no subchannel for which the communication node 300 is elected, the communication node 300 increases the temporary transmission time (TmepXmtTime) by 1 in operation S508, and the above processes are repeated from the operation S504 of electing competing nodes.

As described above, the communication node 300 increases the temporary transmission time by 1 and repeats the above processes from the operation of selecting competing nodes until the communication node 300 is selected for at least one (or the required number) subchannel in the subchannel-level mesh election process.

According to exemplary embodiments of the present invention, collision between adjacent nodes is avoided in an OFDMA-based wireless mesh network so that network reliability and stability can be improved and uncertainty as to the transmission of the adjacent nodes can be minimized, thus increasing resource utilization rates and frequency efficiency.

Exemplary embodiments of the present invention are not limited to the devices and/or methods set forth above, and may be implemented through programs embodying functions corresponding to the configurations of the exemplary embodiments of the present invention or through recording media having such programs recorded thereon. Such implementation can be easily achieved by a person of an ordinary skill in the art from the above disclosure of the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for access control in a communication node of an orthogonal frequency division multiple access (OFDMA)-based wireless mesh network, the method comprising:

receiving information regarding a next transmission time of a 1-hop node and a 2-hop node through the 1-hop node;

calculating next transmission intervals of the 1-hop node and the 2-hop node by using the information regarding the next transmission time of the 1-hop node and the 2-hop node;

determining a subframe and a subchannel corresponding to the next transmission time of the communication node by using the next transmission intervals of the 1-hop node and the 2-hop node; and transmitting the information regarding the next transmission time of the communication node to the 1-hop node of the communication node.

2. The method of claim 1, wherein the receiving comprises receiving first and second parameters of the 1-hop node and first to third parameters of the 2-hop node, wherein the next transmission interval of the 1-hop node is calculated by an equation below:

$$\text{ReceiveTime}+2^{Exp}*Mx \leq \text{Next transmission Interval} < \text{ReceiveTime}+2^{Exp}*Mx+1$$

and the next transmission interval of the 2-hop node is calculated by an equation below:

$$\text{ReceiveTime}+2^{Exp}*Mx+RxFwd\text{TimeDiff} \leq \text{Next transmission interval} < \text{ReceiveTime}+2^{Exp}*Mx+1+RxFwd\text{TimeDiff}$$

wherein the first, second, and third parameters correspond to Exp, Mx, and RxFwdTimeDiff, and the ReceiveTime indicates the time when the first to third parameters are received.

3. The method of claim 2, wherein the transmitting of the information regarding next transmission time of the communication node to the 1-hop node of the communication node comprises:

calculating the first parameter and the second parameter corresponding to the next transmission time of the communication node; and transmitting the first and second parameters to the 1-hop node of the communication node.

4. The method of claim 3, wherein the calculating of the first parameter and the second parameter comprises:

determining the first parameter according to at least one of a predetermined system value, QoS, and priority; and calculating the second parameter by using the determined first parameter and the next transmission time of the communication node.

5. The method of claim 2, wherein the transmitting of the information regarding the next transmission time to the 1-hop node of the communication node comprises:

obtaining the third parameter from a time difference between the time when the first and second parameters of the 1-hop node are received and the time when the first parameter and the second parameter of the communication node are to be transmitted; and transmitting the first to third parameters to the 1-hop node.

6. The method of claim 5, wherein the transmitting of the information regarding the next transmission time of the communication node to the 1-hop node of the communication node further comprises not transmitting the first to third parameters of the 1-hop node when a minimum value in the next transmission interval of the 1-hop node is prior to the time when the first parameter and the second parameter of the communication node are to be transmitted.

7. The method of claim 1, wherein the transmitting of the information regarding the next transmission time of the communication node to the 1-hop node of the communication node comprises setting information of the subchannel corresponding to the next transmission time in a bitmap and transmitting the same.

8. The method of claim 1, wherein the determining comprises:

electing competing nodes to participate in competition for subframe resources with the communication node by using the next transmission intervals of the 1-hop node and the 2-hop node;

determining the subframe corresponding to the next transmission time by using the next transmission interval of the 1-hop node among the competing nodes;

electing subchannel-level competing nodes in the subframe corresponding to the next transmission time to participate in competition for subchannel resources with the communication node; and determining the subchannel corresponding to the next transmission time by using the next transmission interval of the subchannel level competing node with respect to each subchannel of the subframe corresponding to the next transmission time.

9. The method of claim 8, wherein the electing of the competing nodes comprises electing a node that satisfies at least one of first to third conditions as the competing node, wherein the first condition is that the next transmission intervals of the 1-hop node and the 2-hop node include a temporary transmission time of the communication node, the second condition is that the sum of minimum values in the next transmission intervals of the 1-hop node and the 2-hop node and a hold-off time for which the 1-hop node and the 2-hop node cannot transmit is smaller than the temporary transmission time of the communication node, and the third condition is that information of the next transmission time is unavailable.

10. The method of claim 9, wherein the electing of the subframe-level competing nodes further comprises varying the hold-off time according to a density of communication nodes in the wireless mesh network, delay conditions, a period of resources, and the amount of resources.

11. The method of claim 8, wherein the determining of the subframe corresponding to the next transmission time comprises executing a mesh election algorithm by using the 1-hop node of the competing nodes and a target subframe.

12. The method of claim 11, wherein the electing of the subchannel-level competing nodes comprises:

executing a self mesh election algorithm with the 1-hop node using the 2-hop node among the competing nodes; and electing the 2-hop node elected by the mesh election algorithm as the subchannel level competing node.

13. The method of claim 8, wherein the determining of the subchannel corresponding to the next transmission time comprises executing a mesh election algorithm by using the subchannel-level competing node, a target subframe, and a subchannel with respect to each sub-channel of the subframe corresponding to the next transmission time.

14. The method of claim 13, wherein the executing of the mesh election algorithm comprises executing the mesh election algorithm by using subchannel-level competing nodes other than nodes for which a corresponding subchannel is not reserved while satisfying the condition that the next transmission intervals of the subchannel-level competing nodes include the temporary transmission time of the communication node, among the subchannel-level competing nodes.

15. An apparatus for access control of a communication node in an orthogonal frequency division multiple access (OFDMA)-based wireless mesh network, comprising:

a processor configured to execute one or more units, the one or more units including:

a transmission-time determining unit that calculates next transmission intervals of a 1-hop node and a 2-hop node, and that determines a subframe and a subchannel corresponding to a next transmission time of the communication node by using next transmission intervals of the 1-hop node and the 2-hop node; and an information transmitting unit that obtains at least one parameter used in expressing a next transmission interval of the communication node from the next transmission time of the communication node, and that transmits the at least one parameter to the 1-hop node of the communication node.

16. The apparatus of claim 15, wherein the information transmitting unit determines a first parameter according to a predetermined system value or QoS, and calculates a second parameter by using a time when the first parameter and the at least one parameter are to be transmitted and the next transmission time of the communication node.

17. The apparatus of claim 16, wherein the one or more units further include:

an information receiving unit that receives the first and second parameters indicating the next transmission time of the 1-hop node from the 1-hop node, wherein the information transmitting unit acquires a third parameter from a time difference between a time when the first and second parameters of the 1-hop node are received and a time when the at least one parameter of the communication node is to be transmitted, and transmitting the first to third parameters of the 1-hop node together with the at least one parameter.

18. The apparatus of claim 17, wherein the information receiving unit receives, from the 1-hop node, first to third parameters of the 2-hop node together with the first and second parameters of the 1-hop node, and the transmission-time determining unit calculates the next transmission interval of the 1-hop node by using an equation below:

$$\text{ReceiveTime} + 2^{Exp} * Mx \leq \text{Next transmission interval} < \text{ReceiveTime} + 2^{Exp} * Mx + 1$$

and calculates the next transmission interval of the 2-hop node by using an equation below:

$$\text{ReceiveTime} + 2^{Exp} * Mx + RxFwd\text{TimeDiff} < \text{Next transmission interval} < \text{ReceiveTime} + 2^{Exp} * Mx + 1 + RxFwd\text{TimeDiff}$$

wherein the first to third parameters correspond to Exp, Mx and RxFwdTimeDiff, respectively, and the ReceiveTime corresponds to the time when the first to third parameters of the 2-hop node were received.

19. The apparatus of claim 15, wherein the transmission-time determining unit elects competing nodes to compete with the communication node by using the next transmission intervals of the 1-hop node and the 2-hop node, and determines 1-hop nodes among the competing nodes as subframe-level competing nodes to participate in competition for subframe resources to thus determine a subframe for the next transmission time through a mesh election algorithm, and the transmission-time determining unit elects subchannel-level competing nodes to participate in competition for subchannel resources with the communication node in 2-hop nodes among the competing nodes in the subframe corresponding to the next transmission time.

20. The apparatus of claim 15, wherein information of a subchannel corresponding to the next transmission time is set as a bitmap and transmitted.

* * * * *